(12) United States Patent
Chatterjee et al.

(10) Patent No.: US 9,999,063 B2
(45) Date of Patent: *Jun. 12, 2018

(54) RESOURCE ALLOCATION FOR D2D DISCOVERY IN AN LTE NETWORK

(71) Applicant: Intel IP Corporation, Santa Clara, CA (US)

(72) Inventors: Debdeep Chatterjee, Mountain View, CA (US); Alexey Vladimirovich Khoryaev, Nizhny Novgorod (RU); Huaning Niu, Milpitas, CA (US); Gang Xiong, Beaverton, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/730,287

(22) Filed: Oct. 11, 2017

(65) Prior Publication Data

US 2018/0035441 A1  Feb. 1, 2018

Related U.S. Application Data

(63) Continuation of application No. 15/026,753, filed as application No. PCT/US2014/062349 on Oct. 27, 2014, now Pat. No. 9,826,539.

(Continued)

(51) Int. Cl.
*H04W 4/00* (2009.01)
*H04W 72/10* (2009.01)
(Continued)

(52) U.S. Cl.
CPC .......... *H04W 72/10* (2013.01); *H04B 17/318* (2015.01); *H04J 3/1694* (2013.01);
(Continued)

(58) Field of Classification Search
None
See application file for complete search history.

(56) References Cited

U.S. PATENT DOCUMENTS

| 9,118,452 B2 | 8/2015 | Park et al. |
| 9,144,091 B2 | 9/2015 | Yamada et al. |

(Continued)

FOREIGN PATENT DOCUMENTS

| CN | 100411470 C | 8/2008 |
| CN | 105379148 A | 3/2016 |

(Continued)

OTHER PUBLICATIONS

"[Draft] LS on KeNB* generation in case of MFBI", R2-131153, 3GPP TSG RAN WG2 Meeting #80 bis, (May 24, 2013), 1 pg.

(Continued)

*Primary Examiner* — Afshawn M Towfighi
(74) *Attorney, Agent, or Firm* — Schwegman Lundberg & Woessner, P.A.

(57) ABSTRACT

Embodiments of user equipment (UE), an enhanced node B (eNB), and methods of signaling for proximity services and device-to-device (D2D) discovery in an LTE network are generally described herein. In some embodiments, the UE receives configuration information for a D2D discovery resource pool of a cell. The configuration information includes an indication that the D2D discovery resource pool has been logically divided into a plurality of sub-discovery resource pools. The UE performs an initial transmission of a discovery signal in a discovery period using a single D2D discovery resource from a first sub-discovery resource pool of the plurality of sub-discovery resource pools. The UE performs a number of additional transmissions of the discovery signal in the discovery period using additional D2D discovery resources from sub-discovery resource pools of the plurality of sub-discovery resource pools other than the (Continued)

first sub-discovery resource pool. Other apparatuses and methods are also described.

28 Claims, 4 Drawing Sheets

Related U.S. Application Data

(60) Provisional application No. 61/898,425, filed on Oct. 31, 2013.

(51) Int. Cl.

| | | |
|---|---|---|
| *H04W 28/08* | (2009.01) |
| *H04W 74/08* | (2009.01) |
| *H04B 17/318* | (2015.01) |
| *H04W 56/00* | (2009.01) |
| *H04L 5/00* | (2006.01) |
| *H04J 3/16* | (2006.01) |
| *H04W 76/02* | (2009.01) |
| *H04W 8/06* | (2009.01) |
| *H04W 8/18* | (2009.01) |
| *H04W 60/00* | (2009.01) |
| *H04W 60/02* | (2009.01) |
| *H04W 72/08* | (2009.01) |
| *H04W 72/04* | (2009.01) |
| *H04W 52/34* | (2009.01) |
| *H04W 8/00* | (2009.01) |
| *H04W 36/00* | (2009.01) |
| *H04W 4/02* | (2018.01) |
| *H04W 48/12* | (2009.01) |
| *H04W 28/02* | (2009.01) |
| *H04W 48/18* | (2009.01) |
| *H04W 48/08* | (2009.01) |
| *H04W 74/00* | (2009.01) |
| *H04W 48/06* | (2009.01) |
| *H04W 24/10* | (2009.01) |
| *H04W 88/16* | (2009.01) |
| *H04W 88/02* | (2009.01) |
| *H04B 7/0413* | (2017.01) |
| *H04W 8/04* | (2009.01) |
| *H04W 88/08* | (2009.01) |
| *H04W 84/12* | (2009.01) |
| *H04W 92/20* | (2009.01) |

(52) U.S. Cl.
CPC .......... *H04L 5/0007* (2013.01); *H04W 4/003* (2013.01); *H04W 4/008* (2013.01); *H04W 4/02* (2013.01); *H04W 4/023* (2013.01); *H04W 8/005* (2013.01); *H04W 8/06* (2013.01); *H04W 8/183* (2013.01); *H04W 24/10* (2013.01); *H04W 28/0215* (2013.01); *H04W 28/08* (2013.01); *H04W 36/0055* (2013.01); *H04W 48/06* (2013.01); *H04W 48/08* (2013.01); *H04W 48/12* (2013.01); *H04W 48/18* (2013.01); *H04W 52/346* (2013.01); *H04W 56/001* (2013.01); *H04W 56/002* (2013.01); *H04W 60/00* (2013.01); *H04W 60/02* (2013.01); *H04W 72/048* (2013.01); *H04W 72/0453* (2013.01); *H04W 72/0486* (2013.01); *H04W 72/085* (2013.01); *H04W 74/004* (2013.01); *H04W 74/0833* (2013.01); *H04W 76/02* (2013.01); *H04W 76/023* (2013.01); *H04W 76/025* (2013.01); *H04W 76/027* (2013.01); *H04W 76/028* (2013.01); *H04B 7/0413* (2013.01); *H04L 5/001* (2013.01); *H04L 5/0098* (2013.01); *H04W 8/04* (2013.01); *H04W 84/12* (2013.01); *H04W 88/02* (2013.01); *H04W 88/08* (2013.01); *H04W 88/16* (2013.01); *H04W 92/20* (2013.01)

(56) References Cited

U.S. PATENT DOCUMENTS

| | | |
|---|---|---|
| 9,210,675 B2 | 12/2015 | Dinan |
| 9,258,747 B2 | 2/2016 | Sivanesan et al. |
| 9,332,473 B2 | 5/2016 | Yamada |
| 9,338,711 B2 | 5/2016 | Wu |
| 9,374,151 B2 | 6/2016 | Xiong et al. |
| 9,554,305 B2 | 1/2017 | Moustafa et al. |
| 9,648,514 B2 | 5/2017 | Blankenship et al. |
| 9,674,852 B2 | 6/2017 | Heo |
| 9,693,338 B2 * | 6/2017 | Zhao ................. H04W 72/04 |
| 9,713,022 B2 | 7/2017 | Yamada |
| 9,826,539 B2 | 11/2017 | Chatterjee et al. |
| 2003/0013443 A1 | 1/2003 | Willars et al. |
| 2007/0291733 A1 | 12/2007 | Doran et al. |
| 2008/0080428 A1 | 4/2008 | Jappila et al. |
| 2008/0205379 A1 | 8/2008 | Naqvi |
| 2009/0016249 A1 | 1/2009 | Li et al. |
| 2009/0196277 A1 | 8/2009 | Horn et al. |
| 2009/0270098 A1 | 10/2009 | Gallagher et al. |
| 2010/0208654 A1 | 8/2010 | Sampath et al. |
| 2011/0080825 A1 | 4/2011 | Dimou et al. |
| 2011/0164562 A1 | 7/2011 | Qiu et al. |
| 2011/0280212 A1 | 11/2011 | Lv |
| 2012/0020291 A1 | 1/2012 | Nasielski et al. |
| 2012/0063298 A1 | 3/2012 | Yi et al. |
| 2012/0088498 A1 | 4/2012 | Xiao et al. |
| 2012/0202557 A1 | 8/2012 | Olofsson et al. |
| 2012/0218970 A1 | 8/2012 | Westberg et al. |
| 2012/0236776 A1 | 9/2012 | Zhang et al. |
| 2012/0276897 A1 | 11/2012 | Kwon et al. |
| 2012/0327821 A1 | 12/2012 | Lin et al. |
| 2012/0327894 A1 | 12/2012 | Axmon et al. |
| 2013/0022023 A1 | 1/2013 | Aydin |
| 2013/0023269 A1 | 1/2013 | Wang et al. |
| 2013/0023302 A1 | 1/2013 | Sivanesan et al. |
| 2013/0044690 A1 | 2/2013 | Shaheen |
| 2013/0051507 A1 | 2/2013 | Jantunen et al. |
| 2013/0109301 A1 | 5/2013 | Hakola et al. |
| 2013/0121249 A1 | 5/2013 | Ji et al. |
| 2013/0183963 A1 | 7/2013 | Turtinen et al. |
| 2013/0183974 A1 | 7/2013 | Johansson et al. |
| 2013/0332559 A1 | 12/2013 | Mas Ivars et al. |
| 2014/0098761 A1 | 4/2014 | Lee et al. |
| 2014/0148174 A1 | 5/2014 | Teyeb et al. |
| 2014/0219248 A1 | 8/2014 | Reddiboyana et al. |
| 2014/0242963 A1 | 8/2014 | Novlan et al. |
| 2014/0301305 A1 | 10/2014 | Xu et al. |
| 2014/0335869 A1 | 11/2014 | Choi et al. |
| 2015/0043420 A1 | 2/2015 | Xiong et al. |
| 2015/0049707 A1 | 2/2015 | Vajapeyam et al. |
| 2015/0078335 A1 | 3/2015 | Sivanesan et al. |
| 2015/0117183 A1 | 4/2015 | Heo et al. |
| 2015/0181479 A1 | 6/2015 | Lin et al. |
| 2015/0195750 A1 | 7/2015 | Sivanesan et al. |
| 2015/0195865 A1 | 7/2015 | Lee et al. |
| 2015/0207672 A1 | 7/2015 | Xu et al. |
| 2015/0223258 A1 | 8/2015 | Jung et al. |
| 2015/0244429 A1 | 8/2015 | Zhang et al. |
| 2015/0263836 A1 | 9/2015 | Kim |
| 2015/0312005 A1 | 10/2015 | Huang et al. |
| 2015/0327162 A1 | 11/2015 | Lee et al. |
| 2015/0373609 A1 | 12/2015 | Kim et al. |
| 2016/0044567 A1 | 2/2016 | Baghel et al. |
| 2016/0135103 A1 | 5/2016 | Lee et al. |
| 2016/0205612 A1 * | 7/2016 | Seo .................. H04L 1/004 |
| | | 370/252 |
| 2016/0219541 A1 | 7/2016 | Chatterjee et al. |
| 2016/0227448 A1 | 8/2016 | Wu |
| 2016/0227580 A1 | 8/2016 | Xiong |
| 2016/0234847 A1 | 8/2016 | Zhang et al. |

(56) References Cited

U.S. PATENT DOCUMENTS

| | | |
|---|---|---|
| 2016/0242128 A1 | 8/2016 | Loehr et al. |
| 2016/0249259 A1 | 8/2016 | Park et al. |
| 2016/0255602 A1 | 9/2016 | Zaus |
| 2016/0255615 A1 | 9/2016 | Chatterjee et al. |
| 2016/0255640 A1 | 9/2016 | Zitzmann et al. |
| 2016/0255665 A1 | 9/2016 | Futaki |
| 2016/0262149 A1 | 9/2016 | Futaki et al. |
| 2016/0295614 A1 | 10/2016 | Lee et al. |
| 2016/0359548 A1 | 12/2016 | Xiong |
| 2017/0273095 A1 | 9/2017 | Heo et al. |

FOREIGN PATENT DOCUMENTS

| | | |
|---|---|---|
| CN | 105556994 A | 5/2016 |
| CN | 105557051 A | 5/2016 |
| CN | 105557052 A | 5/2016 |
| CN | 105594140 A | 5/2016 |
| CN | 105594266 A | 5/2016 |
| CN | 105612786 A | 5/2016 |
| CN | 106411490 A | 2/2017 |
| EP | 2472950 A1 | 7/2012 |
| EP | 3031147 A1 | 6/2016 |
| EP | 3047679 A1 | 7/2016 |
| EP | 3063883 A1 | 9/2016 |
| EP | 3063982 A1 | 9/2016 |
| EP | 3064012 A1 | 9/2016 |
| HK | 1221826 A | 6/2017 |
| JP | 2010258715 A | 11/2010 |
| JP | 2016531533 A | 10/2016 |
| JP | 6162330 B2 | 7/2017 |
| KR | 1020090124788 A | 12/2009 |
| KR | 1020110038571 A | 4/2011 |
| KR | 1020160039235 A | 4/2016 |
| WO | WO-2011120853 A1 | 10/2011 |
| WO | WO-2012150815 A2 | 11/2012 |
| WO | WO-2012159270 A1 | 11/2012 |
| WO | WO-2013104413 A1 | 7/2013 |
| WO | WO-2013108048 A1 | 7/2013 |
| WO | WO-2015021320 A1 | 2/2015 |
| WO | WO-2015042100 A1 | 3/2015 |
| WO | WO-2015065619 A1 | 5/2015 |
| WO | WO-2015065768 A1 | 5/2015 |
| WO | WO-2015065881 A1 | 5/2015 |
| WO | WO-2015065947 A1 | 5/2015 |
| WO | WO-2015066281 A1 | 5/2015 |
| WO | WO-2015066476 A1 | 5/2015 |

OTHER PUBLICATIONS

"3rd Generation Partnership Project; Technical Specification Group Core Network and Terminals; General Packet Radio Service (GPRS); Serving GPRS Support Node (SGSN)—Visitors Location Register (VLR); Gs interface layer 3 specification (Release 11)", 3GPP TS 29.018, V11.6.0, (Mar. 2013), 62 pgs.

"3rd Generation Partnership Project; Technical Specification Group Core Network and Terminals; Mobile radio interface Layer 3 specification; Core network protocols; Stage 3 (Release 11)", 3GPP TS 24.008, V 11.8.0, (Sep. 2013), 677 pgs.

"3rd Generation Partnership Project; Technical Specification Group Core Network and Terminals; Non-Access-Stratum (NAS) protocol for Evolved Packet System (EPS); Stage 3 (Release 11)", 3GPP TS 24.301, V11.8.0, (Sep. 2013), 345 pgs.

"3rd Generation Partnership Project; Technical Specification Group Services and System Aspects; Circuit Switched (CS) fallback in Evolved Packet System (EPS); Stage 2 (Release 12)", 3GPP Standard; 3GPP TS 23.272, 3rd Generation Partnership Project (3GPP), Mobile Competence Centre, F-06921 Sophia-Antipolis Cedex, (Sep. 11, 2013), 1-97.

"U.S. Appl. No. 13/659,655, Response filed Jul. 14, 2016 to Final Office Action dated May 20, 2016", 17 pgs.

"U.S. Appl. No. 14/279,562, Notice of Allowance dated Sep. 4, 2015", 9 pgs.

"U.S. Appl. No. 14/311,938, Examiner Interview Summary dated Jan. 22, 2016", 3 pgs.

"U.S. Appl. No. 14/311,938, Non Final Office Action dated Nov. 2, 2015", 14 pgs.

"U.S. Appl. No. 14/311,938, Notice of Allowance dated Feb. 29, 2016", 5 pgs.

"U.S. Appl. No. 14/311,938, Response filed Jan. 18, 2016 to Non Final Office Action dated Nov. 2, 2015", 7 pgs.

"U.S. Appl. No. 14/491,639, Final Office Action dated Oct. 31, 2016", 19 pgs.

"U.S. Appl. No. 14/491,639, Non Final Office Action dated Apr. 8, 2016", 16 pgs.

"U.S. Appl. No. 14/491,639, Notice of Allowance dated Jan. 20, 2017", 6 pgs.

"U.S. Appl. No. 14/491,639, PTO Response to Rule 312 Communication dated May 11, 2017", 2 pgs.

"U.S. Appl. No. 14/491,639, Response filed Jan. 3, 2017 to Final Office Action dated Oct. 31, 2016", 10 pgs.

"U.S. Appl. No. 14/491,639, Response filed Aug. 8, 2016 to Non Final Office Action dated Apr. 8, 2016", 9 pgs.

"U.S. Appl. No. 14/659,655, Corrected Notice of Allowance dated Dec. 15, 2016", 2 pgs.

"U.S. Appl. No. 14/659,655, Final Office Action dated May 20, 2016", 10 pgs.

"U.S. Appl. No. 14/659,655, Non Final Office Action dated Jan. 21, 2016", 10 pgs.

"U.S. Appl. No. 14/659,655, Notice of Allowance dated Aug. 3, 2016", 8 pgs.

"U.S. Appl. No. 14/659,655, Preliminary Amendment filed Mar. 18, 2015", 47 pgs.

"U.S. Appl. No. 14/916,843, Non Final Office Action dated Jun. 23, 2017", 33 pgs.

"U.S. Appl. No. 14/916,843, Response Filed Sep. 25, 2017 to Non Final Office Action dated Jun. 23, 2017", 15 pgs.

"U.S. Appl. No. 14/917,154, Final Office Action dated Oct. 25, 2017", 9 pgs.

"U.S. Appl. No. 14/917,154, Non Final Office Action dated Jun. 29, 2017", 7 pgs.

"U.S. Appl. No. 14/917,154, Preliminary Amendment filed Mar. 7, 2016", 3 pgs.

"U.S. Appl. No. 14/917,154, Response filed Sep. 29, 2017 to Non Final Office Action dated Jun. 29, 2017", 10 pgs.

"U.S. Appl. No. 14/917,451, Non Final Office Action dated Jul. 25, 2017", 16 pgs.

"U.S. Appl. No. 14/917,451, Preliminary Amendment filed Mar. 8, 2016", 3 pgs.

"U.S. Appl. No. 14/917,451, Response filed Oct. 25, 2017 to Non Final Office Action dated Jul. 25, 2017", 11 pgs.

"U.S. Appl. No. 15/026,174, Final Office Action dated Nov. 3, 2017", 21 pgs.

"U.S. Appl. No. 15/026,174, Non Final Office Action dated May 19, 2017", 15 pgs.

"U.S. Appl. No. 15/026,174, Response filed Jul. 20, 2017 to Non Final Office Action dated May 19, 2017", 9 pgs.

"U.S. Appl. No. 15/026,753, Corrected Notice of Allowance dated Aug. 2, 2017", 2 pgs.

"U.S. Appl. No. 15/026,753, Corrected Notice of Allowance dated Oct. 13, 2017", 2 pgs.

"U.S. Appl. No. 15/026,753, Notice of Allowance dated Jul. 19, 2017", 12 pgs.

"U.S. Appl. No. 15/026,753, Notice of Allowance dated Oct. 19, 2017", 2 pgs.

"U.S. Appl. No. 15/026,788, Non Final Office Action dated Apr. 11, 2017", 21 pgs.

"U.S. Appl. No. 15/026,788, Notice of Allowance dated Aug. 31, 2017", 7 pgs.

"U.S. Appl. No. 15/026,788, Preliminary Amendment filed Apr. 1, 2016", 9 pgs.

"U.S. Appl. No. 15/026,788, Response filed Jul. 11, 2017 to Non Final Office Action dated Apr. 11, 2017", 11 pgs.

"U.S. Appl. No. 15/186,832, Preliminary Amendment filed Aug. 17, 2016", 8 pgs.

(56) References Cited

OTHER PUBLICATIONS

"U.S. Appl. No. 14/659,655, Response filed Apr. 20, 2016 to Non Final Office Action dated Jan. 21, 2016", 31 pgs.
"Backwards compatibility issues with the approved CRs 24.301-1532 r1 (C1-123946) and 24.008-2296r1 (C1-124701)", 3GPP Draft; C1-132127-Discussion-Periodic-Update. 3rd Generation Partnership Project, Retrieved from the Internet: URL: <http://www.3gpp.org/ftp/tsg ct/WG1_mm-cc-sm_ex-CN1/TSGC1_83_Chengdu/docs/>, (May 13, 2013), 3 pgs.
"Beacon Channel Design for D2D,", Ericsson, 3GPP TSG-RAN WG1#74b R1-134723, 3GPP, (Sep. 27, 2013), 8 pgs.
"Chinese Application Serial No. 201480051969.X, Voluntary Amendment Filed on Jun. 28, 2017", w/English Claims, 22 pgs.
"Clarification of ISR activation condition for NMO II Rau and Periodic RAU", 3GPP DRAFT; S2-120327 REV4-S2-120098 23272CR0720 CSFB RAU and ISR REL8 REV04. 3rd Generation Partnership Project (3GPP), Mobile, (Jan. 24, 2012), 2 pgs.
"Clarification of ISR activation condition for Periodic RAU", 3GPP Draft; S2-120097 Clarification of ISR Activation Disc, 3rd-Generation Partnership Project, Mobile Competence Centr, (Jan. 11, 2012), 5 pgs.
"Comparison of the UP Alternatives", R2-132338, 3GPP TSG-RAN WG2 Meeting #83, Barcelona, Spain, NSN, Nokia Corporation, NTT Docomo, Inc., Samsung, (Aug. 2013), 5 pgs.
"Coverage enhancement of Prach for low cost MTC", Intel Corporation: 3GPP Draft; RI-135104 Intel MTC Prach, 3rd Generation Partnership Project (3GPP), Mobile Competence Centre ; 650, Route Des Lucioles ; F-06921 Sophia-Antipolis Cedex ; France, (Nov. 2, 2013), 8 pgs.
"Coverage Improvement for Prach", Intel Corporation: 3GPP Draft; RI-140115—Intel MTC Prach 3rd Generation Partnership Project (3GPP), Mobile Competence Centre ; 650, Route Des Lucioles ; F-06921 Sophia-Antipolis Cedex ; France, [Online] Retrieved from the Internet : <http://www.3gpp.org/ftp/tsg ran/WGIRLI/TSGRI_76/Docs/>, (Feb. 1, 2014), 9 pgs.
"D2D synchronization—with network coverage", 3GPP TSG-RAN, WG1 Meeting #74bis, R1-134537, (Oct. 11, 2013), 4 pgs.
"Data split options and considerations on U-plane protocol architecture for dual-connectivity", R2-131054, 3GPP TSG-RAN WG2 Meeting #81bis, Chicago, USA Nokia Siemens Networks, (Apr. 2013), 9 pgs.
"Discovery Mode and Data Flow for D2D Discovery", CATT, 3GPP TSG-RAN WG2#83bis R2-133217, 3GPP, (Sep. 27, 2013), 4 pgs.
"Discussion on Multi-level Prach Coverage Enhancement", R1-140616 3GPP TSG RAN WG1 Meeting #76 NTT DOCOMO, (Feb. 2014), 1-6.
"Discussion on Prach Coverage Enhancement for Low Cost MTC", Intel Corporation: 3GPP Draft; R1-132930—Discussion on Prach Coverage Enhancement for Low Cost MTC, 3rd Generation Partnership Project (3GPP), Mobile Competence Centre ; 650, Route Deslucioles ; F-06921 Sophia-Antipo vol. RAN WG1, No. Barcelona, Spain, (Aug. 10, 2013), 7 pgs.
"Discussion on Public Safety UE-Network Relays", 3GPP TSG RAN WG1 Meeting #74bis R1-134803, (Oct. 2, 2013), 4 pgs.
"Discussion on Resource Allocation for D2D Discovery", ZTE, 3GPP TSG-RAN WG1#74b R1-134309, 3GPP, (Sep. 28, 2013), 11 pgs.
"European Application Serial No. 14834710.7, Extended European Search Report dated Mar. 22, 2017", 9 pgs.
"European Application Serial No. 14834710.7, Response Filed Oct. 9, 2017 to Extended European Search Report dated Mar. 22, 2017", 55 pgs.
"European Application Serial No. 14846552.9, Extended European Search Report dated Mar. 17, 2017", 7 pgs.
"European Application Serial No. 14856919.7, Extended European Search Report dated May 17, 2017", 8 pgs.
"European Application Serial No. 14857392.6, Extended European Search Report dated Jun. 20, 2017", 10 pgs.
"European Application Serial No. 14858430.3, Extended European Search Report dated Mar. 7, 2017", 9 pgs.
"European Application Serial No. 14858430.3, Response Filed Sep. 25, 2017 to Extended European Search Report dated Mar. 7, 2017", 13 pgs.
"European Application Serial No. 14858666.2, Extended European Search Report dated Mar. 7, 2017", 8 pgs.
"European Application Serial No. 14858666.2, Response Filed Oct. 4, 2017 to Extended European Search Report dated Mar. 7, 2017", 28 pgs.
"European Application Serial No. 14858860.1, Extended European Search Report dated Mar. 28, 2017", 9 pgs.
"European Application Serial No. 14858860.1, Response filed Oct. 30, 2017 to Extended European Search Report dated Mar. 28, 2017", 12 pgs.
"European Application Serial No. 14859145.6, Extended European Search Report dated Mar. 22, 2017", 8 pgs.
"European Application Serial No. 14859145.6, Response Filed Oct. 17, 2017 to Extended European Search Report dated Mar. 22, 2017", 11 pgs.
"European Application Serial No. 17170538.7, Extended European Search Report dated Sep. 12, 2017", 10 pgs.
"Evolved Universal Terrestrial Radio Access (E-UTRA); Multiplexing and channel coding", 3GPP TS 36.212 version 8.8.0 Release 8 LTE, (Jan. 2010), 62 pgs.
"Evolved Universal Terrestrial Radio Access (E-UTRA); Physical channels and modulation", 3GPP TS 36.211 version 9.1.0 Release 9 LTE, (Apr. 2010), 87 pgs.
"Evolved Universal Terrestrial Radio Access (E-UTRA); Physical layer procedures", 3GPP TS 36.213 V11.0.0 3rd Generation Partnership Project; Technical Specification Group Radio Access Network;, (Sep. 2012), 143 pgs.
"Evolved Universal Terrestrial Radio Access (E-UTRA); Radio Resource Control (RRC); Protocol specification", 3GPP TS 36.331 version 8.6.0 Release 8 ETSI, (Jul. 2009), 211 pgs.
"Further considerations on MTC coverage enhancement", Motorola Mobility, RI-132467, 3GPP TSG RAN WG1 Meeting #73, Fukuoka, Japan, (May 20-24, 2013), 1-3.
"Further discussion on CSFB with ISR", 3GPP Draft; S2-120825 Was S2-120739 CSFB ISR PeriodICR, 3rd Generation Partnership Project, Mobile Competence Centr, (Feb. 3, 2012), 26 pgs.
"Further discussion on resource allocation for D2D discovery", R1-134116 3GPP TSG RAN WG1 Meeting #74bis CATT, (Oct. 11, 2013), 1-6.
"HiSilicon", Huawei,D2D discovery message size, 3GPP TSG-RAN WG1#74b R1-134075, 3GPP, (Sep. 28, 2013), 4 pgs.
"Impacts of Splitting a Single EPS Bearer between Two (or more) eNBs", R2-131401, 3GPP TSG RAN WG2 Meeting #81bis. Chicago, USA, Intel Corporation, (Apr. 2013), 9 pgs.
"Indian Application Serial No. 201647004844, Voluntary Amendment filed on Jul. 19, 2017", (W/ English Claims), 17 pgs.
"Indian Application Serial No. 201647004844, Voluntary Amendment dated Aug. 3, 2016", W/ English Translation, 14 pgs.
"Inter-corresponding sets of resources for D2D discovery", R1-134365 3GPP TSG RAN WG1 Meeting #74bis HTC, (Oct. 11, 2013), 1-2.
"International Application Serial No. PCT/US2014/050214, International Preliminary Report on Patentability dated Feb. 18, 2016", 7 pgs.
"International Application Serial No. PCT/US2014/050214, International Search Report dated Nov. 19, 2014", 4 pgs.
"International Application Serial No. PCT/US2014/050214, Written Opinion dated Nov. 19, 2014", 5 pgs.
"International Application Serial No. PCT/US2014/056003, International Preliminary Report on Patentability dated Mar. 31, 2016", 7 pgs.
"International Application Serial No. PCT/US2014/056003, International Search Report dated Dec. 16, 2014", 4 pgs.
"International Application Serial No. PCT/US2014/056003, Written Opinion dated Dec. 16, 2014", 5 pgs.
"International Application Serial No. PCT/US2014/056909, International Preliminary Report on Patentability dated May 12, 2016", 6 pgs.
"International Application Serial No. PCT/US2014/056909, International Search Report dated Dec. 26, 2014", 3 pgs.

(56) References Cited

OTHER PUBLICATIONS

"International Application Serial No. PCT/US2014/056909, Written Opinion dated Dec. 26, 2014", 4 pgs.
"International Application Serial No. PCT/US2014/061569, International Preliminary Report on Patentability dated May 12, 2016", 8 pgs.
"International Application Serial No. PCT/US2014/061569, International Search Report dated Jan. 16, 2015", 3 pgs.
"International Application Serial No. PCT/US2014/061569, Written Opinion dated Jan. 16, 2015", 6 pgs.
"International Application Serial No. PCT/US2014/062349, International Preliminary Report on Patentability dated May 12, 2016", 10 pgs.
"International Application Serial No. PCT/US2014/062349, International Search Report dated Jan. 26, 2015", 4 pgs.
"International Application Serial No. PCT/US2014/062349, Written Opinion dated Jan. 26, 2015", 8 pgs.
"International Application Serial No. PCT/US2014/062533, International Preliminary Report on Patentability dated May 12, 2016", 8 pgs.
"International Application Serial No. PCT/US2014/062533, International Search Report dated Jan. 21, 2015", 3 pgs.
"International Application Serial No. PCT/US2014/062533, Written Opinion dated Jan. 21, 2015", 6 pgs.
"International Application Serial No. PCT/US2014/063080, International Preliminary Report on Patentability dated May 12, 2016", 7 pgs.
"International Application Serial No. PCT/US2014/063080, International Search Report dated Feb. 12, 2015", 4 pgs.
"International Application Serial No. PCT/US2014/063080, Written Opinion dated Feb. 12, 2015", 5 pgs.
"International Application Serial No. PCT/US2014/063434, International Preliminary Report on Patentability dated May 12, 2016", 10 pgs.
"International Application Serial No. PCT/US2014/063434, International Search Report dated Feb. 16, 2015", 4 pgs.
"International Application Serial No. PCT/US2014/063434, Written Opinion dated Feb. 16, 2015", 8 pgs.
"Japanese Application Serial No. 2016-516873, Office Action dated Feb. 7, 2017", (W/ English Translation), 10 pgs.
"Japanese Application Serial No. 2016-516873, Response Filed Apr. 28, 2017 to Office Action dated Feb. 7, 2017", (W/ English Claims), 15 pgs.
"Japanese Application Serial No. 2016-544365, Office Action dated Mar. 14, 2017", w. English Translation, 10 pgs.
"Japanese Application Serial No. 2016-544365, Response Filed Jun. 13, 2017 to Office Action dated Mar. 14, 2017", (W/ English Claims), 16 pgs.
"Korean Application Serial No. 10-2016-7004885, Office Action dated Jul. 3, 2017", w/English Translation, 8 pgs.
"Korean Application Serial No. 10-2016-7004885, Response filed Sep. 4, 2017 to Office Action dated Jul. 3, 2017", (W/ English Claims), 19 pgs.
"Korean Application Serial No. 10-2016-7008440, Office Action dated Jul. 18, 2017", (W/ English Translation), 5 pgs.
"Korean Application Serial No. 10-2016-7008440, Response Filed Sep. 18, 2017 to Office Action dated Jul. 18, 2017", (W/ English Claims), 14 pgs.
"Korean Application Serial No. 10-2016-7008440, Voluntary Amendment Filed on Jul. 3, 2017", (W/ English Claims), 26 pgs.
"LS on KeNB* generation in case of MFB", TSG RAN WG2: 3GPP Draft; R2-132224 (Reply LS on KENB and MFBI), 3rd Generation Partnership Project (3GPP), Mobile Competence Centre ; 650, Route Des Lucioles ; F-06921 Sophia-Antipolis Cedex; France, vol. RAN WG2, no. Fukuoka, Japan, (May 23, 2013), 2 pgs.
"LS on signalling of multiple frequency band indicators; prioritization of frequency bands supported", R2-122009, 3GPP TSG RAN WG2 Meeting #78 Ericsson, (May 25, 2012), 1 pg.
"On D2D Discovery Transmission Timing", Intel Corporation, 3GPP Draft; R1-135121-Intel-Discovery Transmission Timing, 3rd Generation Partnership Project (3GPP), Mobile Competence Centre; 650, Route Des Lucioles ; F-06921 Sophia-Antipolis Cedex ; France,, [Online] retrieved from the internet: <:http://www.3gpp.org/ftp/tsg_ran/WG1_RL1/TSGR1_75/Docs/>, 7 pgs.
"On MFBI and EARFCN extension", Renesas Mobile Europe Ltd: 3GPP Draft; GP-130569, 3rd Generation Partnership Project (3GPP), Mobile Competence Centre ; 650, Route Deslucioles ; F-06921 Sophia-Antipolis Cedex; France vol. TSG Geran, no. Sofia, Bulgaria, (Aug. 21, 2013), 1-5.
"On MFBI and EARFCN extension", GP-130431 3GPP TSG Geran#58 Renesas Mobile Europe Ltd.,, (May 2013), 1-5 pgs.
"On Resource Allocation and System Operation for D2D Discovery", R1-135119 3GPP TSG RAN WG1 Meeting #75 Intel Corporation, (Nov. 15, 2013), 1-6.
"On Resource Allocation and System Operation for D2D Discovery", Intel Corporation, 3GPP Draft; R1-134141—Inte—Discovery Resource Allocation, Centre ; 650, Route Des Lucioles ; F-06921 Sophia-Antipolis Cedex ; France vol. RAN WG1, no. Guangzhou, China; 20131007-2013101128, [Online] retrieved from the internet: <:http://www.3gpp.org/ftp/tsg_ran/WG1_RL1/TSGR1_74b/Docs/>, (10/11/13), 10 pgs.
"On Support of Inter-cell D2D Discovery", Intel Corporation, 3GPP Draft; R1-140135-Intel-Inter-Cell Discovery, 3rd Generation Partnership Project (3GPP), Mobile Competence Centre ; 650, Route Des Lucioles ; F-06921 Sophia-Antipolis Cedex ; France, [Online] retrieved from the internet: <:http://www.3gpp.org/ftp/tsg_ran/WG1_RL1/TSGR1_76/ Docs/>, (Feb. 1, 2014), 6 pgs.
"PBCH Coverage Enhancement", Qualcomm Inc, RI-131397, 3GPP TSG-RAN WG1 Meeting #72bis, Chicago. USA, [Online]. Retrieved from the Internet: <URL: http://www.3gpp.org/ftp/tsg_ran/WGl_RL1/TSGRI_72b/Docs/R1-131397.zip>, (Apr. 15-19, 2013), 3 pgs.
"PBCH Coverage Extension for MTC Devices", ITRI, R1-132256. 3GPP TSG RAN WG1 Meeting #73, Fukuoka. Japan, [Online]. Retrieved from the Internet: <URL: http://www.3gpp.org/ftp/tsg_ran/WG1_RL1/TSGRI_73/Docs/R1-32256.zip>, (May 20-24, 2013), 1-3.
"PBCH coverage improvement for low-cost MTC UEs", CATT, R1-130982, 3GPP TSG-RAN WG1 Meeting #72bis, Chicago, USA, [Online]. Retrieved from the Internet: <URL: http://www.3gpp.org/ftp/tsg_ran/WGI_RLI/TSGRI_72b/Docs/R1-130982.zip>, (Apr. 15-19, 2013), 1-4.
"Physical Random Access Channel Coverage Enhancement", R1-134303 TSG RAN WG1 Meeting #74bis, Guangzhou, China ZTE, (Sep. 28, 2013), 1-16.
"PRACH coverage enhancement for MTC UEs", R1-140278 3GPP TSG RAN WG1 Meeting #76 ZTE, (Feb. 2014), 1-8.
"PRACH resource multiplexing to support low cost MTC and coverage enhancement", R1-140027 3GPP TSG RAN WG1 Meeting #76, (Feb. 2014), 1-6.
"Remaining details of D2D discovery resource allocation", Intel Corporation, 3GPP Draft; R1-143766_INTEL_DISC0VERYRA, 3rd Generation Partnership Project (3GPP), Mobile Competence Centre; 650, Route Des Lucioles ; F-06921 Sophia-Antipolis Cedex ; France, XP050875087, [Online] retrieved from the internet: <:http://www.3gpp.org/ftp/Meetings_3GPP_SYNC/RANI/Docs/>, (Oct. 5, 2014), 8 pgs.
"Resource allocation for D2D communication", CATT, 3GPP TSG-RAN WG1#74b R1-134113, 3GPP, (Sep. 28, 2013), 2 pgs.
"Resource allocation for D2D discovery", Alcatel-Lucent Shanghai Bell, Alcatel-Lucent, 3GPP TSG-RAN WG1#74b R1-134232, 3GPP, (Sep. 28, 2013), 2 pgs.
"Resource allocation for D2D discovery", Intel Corporation, 3GPP TSG-RAN WG2#83bis R2-133512, 3GPP, (Sep. 28, 2013), 4 pgs.
"Resource Allocation for D2D Discovery", R1-134232, 3GPP TSG RAN WG1 Meeting #74bis Alcatel-Lucent Shanghai Bell, Alcatel-Lucent, (Oct. 11, 2013), 1-2.
"Uplink scheduling and BSRs with dual connectivity", R2-133412, 3GPP TSG-RAN WG2 Meeting #83bis, Ljubljana,Slovenia Ericsson, (Oct. 2013), 3 pgs.
Alcatel, Lucent, "Feasibility of coverage extension of physical Channels for MTC devices", 3GPP DRAFT; R1-130462—REL-12 MTC Coverage—Coverage Ext Phy Channels V0.3, 3rd Generation

(56) References Cited

OTHER PUBLICATIONS

Partnership Project (3GPP), Mobile Competence Centre ; 650, Route Des Lucioles ; F-06921 Sophia-Antipolis C, [Online] retrieved from the internet: <http://www.3gpp.org/ftp/tsg_ran/WG1_RL1/TSGR1_72/Docs/>, (Jan. 19, 2013), 7 pgs.

Asustek, "Method of resource allocation for D2D discovery", 3GPP Draft; RI-134638 Method of Resource Allocation for D2D Discovery, 3$_{rd}$ Generation Partnership Project (3GPP), Mobile Competence Centre , 650, Route Des Lucioles ; F-06921 Sophia-Antipolis Cedex, XP050717720, [Online] retrieved from the internet: <:http://www.3gpp.org/ftp/tsg_ran/WGI_RLI/TSGRI_74b/Docs/>, (Sep. 28, 2013), 9 pgs.

Ericsson; et al., "Coverage enhancements for MTC—System informa", 3GPP Draft; R1-131680 Coverage Enhancements for MTC System Information, 3rd Generation Partnership Project (3GPP), Mobile Competence Centre; 650, Route Des Lucioles ; F-06921 Sophia-Antipolis Cedex, [Online] retrieved from the internet: <http ://www.3gpp.org/ftp/tsg_ran/WG 1 _RL1 /TSG R1 _72b/Docs/>, (Apr. 16, 2013), 8 pgs.

Huawei, et al., "Discussion on PRACH coverage improvement and mechanism for determining the amount of needed coverage improvement", 3GPP Draft; RI-134054, 3rd Generation Partnership Project (3GPP), Mobile Competence Centre; 650, Route Des Lucioles ; F-06921 S0phia-Antip0lis Cedex, (Sep. 28, 2013), 6 pgs.

Huawei, et al., "DRB configuration and switch in dual Connectivity", 3GPP Draft; R2-142062, 3rd Generation Partnership Project (3GPP), Mobile Competence Centre; 650, Route Des Lucioles ; F-06921 Sophia-Antipolis Cedex ; France, vol. Ran WG2, no. Seoul, South Korea; May 19, 2014-May 23, 2014, [Online] retrieved from the internet: <http://www.3gpp.org/ftp/tsg_ran/WG2_RL2/TSGR2_86/Docs/>, (May 10, 2014), 5 pgs.

Intel Corporation, "On D2D Discovery Transmission Timing", 3GPP TSG-RAN, WG1#75, R1-135955, [Online] retrieved from the internet: <http://www.3gpp.org/ftp/tsg_ran/WG1_RL1/TSGR1_75/Docs/R1-135955>, (Nov. 15, 2013), 7 pgs.

Mediatek Inc., "On Required System Functionalities for MTC UEs Operating in Enhanced Coverage Mode", R1-130218, 3GPP TSG RAN WG1 Meeting #72, St Julian's, Malta, [Online] retrieved from the internet: <(http://www.3gpp.org/ftp/tsg_ran/wg1_rl1/TSGR1_72/Docs/R1-130218.zip)>, (Jan. 19, 2013), 6 pgs.

Nokia, et al., "D2D Discovery Signal", 3GPP Draft; R1-134538, 3rd Generation Partnership Project (3GPP), Mobile Competence Centre; 650, Route Des Lucioles ; F-06921 Sophia-Antipolis Cedex ; France [Online] retrieved from the internet: <:http://www.3gpp.org/ftp/tsg_ran/WG1_RL1/TSGR1_74b/Docs/>, (Sep. 28, 2013), 7 pgs.

Rapportuer, "Introduction of Dual Connectivity (RAN3 topics)", 3GPP Draft; R3-141480-DC-STAGE2-01, 3rd Generation Partnership Project (3GPP), Mobile Competence Centre; 650, Route Des Lucioles ; F-06921 Sophia-Antipolis Cedex; France, vol. RAN WG3, no. Seoul, South Korea; May 19, 2014-May 23, 2014, [Online] retrieved from the internet: <:http://www.3gpp.org/ftp/tsg_ran/WG3_Iu/TSGR3_84/Docs/>, (May 24, 2014), 62 pgs.

Tao, Yun Wang, et al., "Method and system for processing joint position service Gs interface fault", (Aug. 13, 2008), 6 pgs.

"U.S. Appl. No. 14/916,843, Final Office Action dated Nov. 24, 2017", 34 pgs.

"U.S. Appl. No. 15/614,208, Non Final Office Action dated Nov. 30, 2017", 19 pgs.

"European Application Serial No. 14858666.2, Communication Pursuant to Article 94(3) EPC dated Dec. 19, 2017", 5 pgs.

"European Application Serial No. 18159077.9, Extended European Search Report dated Mar. 27, 2018", 8 pgs.

\* cited by examiner

RESOURCE ALLOCATION FOR D2D DISCOVERY IN AN LTE NETWORK

PRIORITY CLAIMS

This application is is a continuation of U.S. patent application Ser. No. 15/026,753, filed Apr. 1, 2016, which is a U.S. National Stage Filing under 35 U.S.C. 371 from International Application No. PCT/US2014/062349, filed on Oct. 27, 2014, and published as WO 2015/065881 on May 7, 2015, which claims the benefit of priority to U.S. Provisional Patent Application Ser. No. 61/898,425, filed Oct. 31, 2013, which are incorporated herein by reference in their entirety.

TECHNICAL FIELD

Embodiments pertain to wireless communications. Some embodiments relate to 3GPP LTE (Long-Term Evolution) networks. Sonic embodiments relate to direct device-to-device (D2D) communication. Some embodiments relate to device discovery in LTE networks.

BACKGROUND

Proximity-based applications and services represent a fast growing social and technological trend that may have a major impact on evolution of cellular wireless/mobile broadband technologies. These services are based on the awareness of two devices or two users being close to each other and may include such applications as public safety operations, social networking, mobile commerce, advertisement, gaming, etc. Device to device (D2D) discovery is the first step to enable D2D service. There are many unresolved issues with respect to device discovery for D2D communication particularly for inter-cell Proximity Service (ProSe) D2D discovery.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
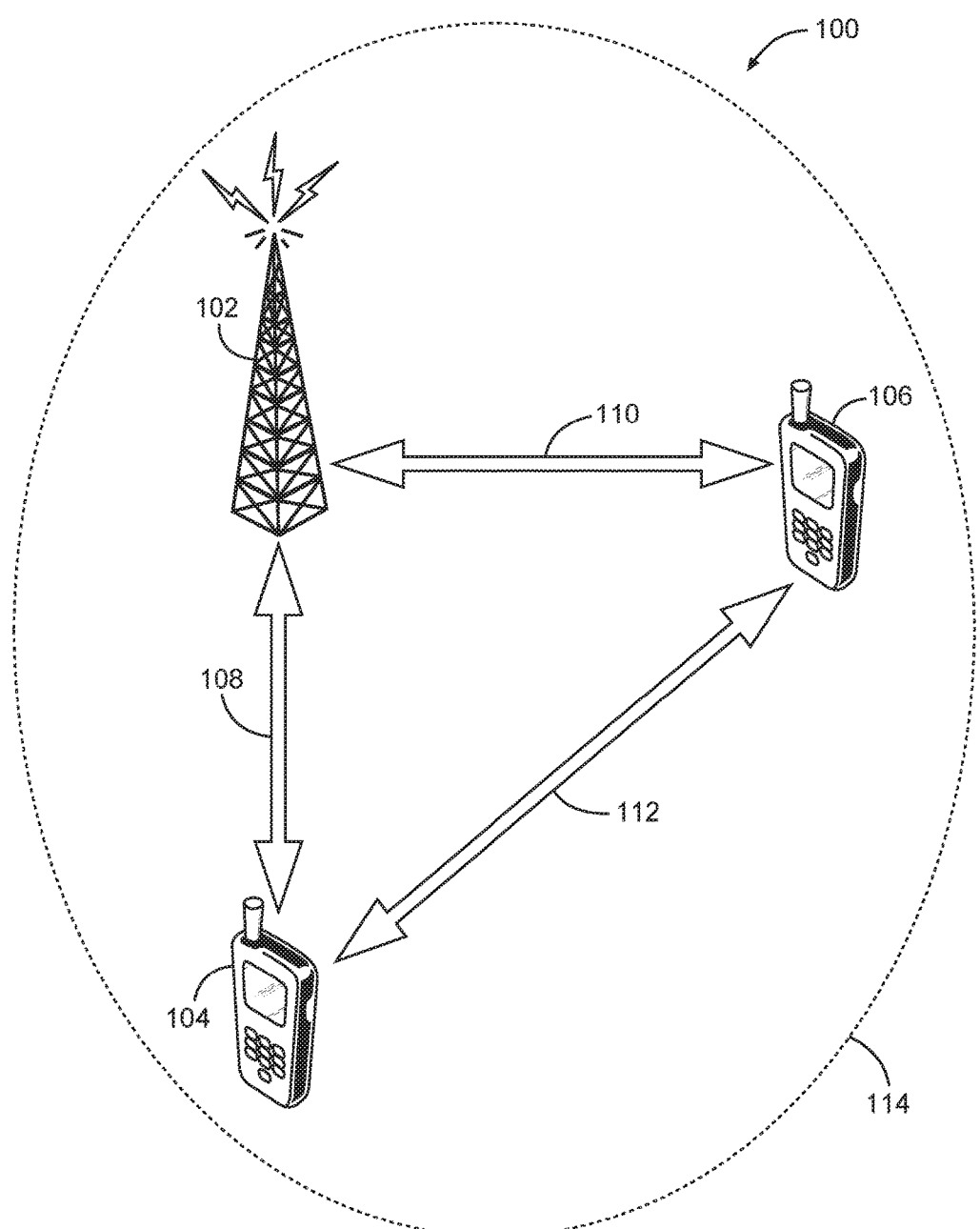
FIG. 1 is an example of a network for implementing device-to-device (D2D) communications in which some embodiments can be implemented.

FIG. 1 illustrates an example operating environment 100 in which some embodiments may be implemented. In operating environment 100, an evolved Node B (eNB) 102 may be in communication with one or more UEs 104, 106 as part of in-network communication sessions over the links 108 and 110, respectively. Techniques and scenarios discussed are not limited to the number or types of eNBs and UEs shown in the example operating environment 100, as any suitable number or types may be used. For instance, the eNB 102 is not limited to the tower configuration shown. The UEs 104, 106 are within a cell 114 and the eNB 102 serves the cell 114.

In addition to the in-network communication sessions, the eNB 102 and UEs 104, 106 may also support direct connections between the UEs 104, 106 or other UEs (not shown in FIG. 1). Such communication may be referred to as device-to-device (D2D) communication. For instance, a D2D communication session between the UEs 104, 106 may take place over the link 112. In some embodiments, the D2D communication session will occur over an uplink (UL), with the eNB 102 allocating UL resources for D2D communication.

D2D discovery is the first step to enable D2D communication. In accordance with current standards of the 3rd Generation Partnership Project (3GPP) family of standards for Long-Term Evolution (LTE), there are at least two types of D2D discovery procedures: Type 1 and Type 2.

In some implementations of a Type 1 D2D discovery procedure, the eNB 102 will allocate resources for discovery signal transmission on a non-UE-specific basis. Therefore, a D2D discovery resource pool comprised of a plurality of individual D2D discovery resources can be used for all UEs within a cell 114, or a group of UEs within the cell 114. In some implementations, a single D2D discovery resource can span two physical resource block (PRB)-pairs in frequency and one subframe in time. In some implementations, the eNB 102 will allocate periodic UL resources for discovery in a semi-static manner. The eNB 102 can perform the resource allocation using Radio Resource Control (RRC) signaling. A UE 104, 106 may be configured to support D2D communication with other UEs using orthogonal frequency-division multiple access (OFDMA), single carrier frequency division multiple access (SC-FDMA) or other multiple access schemes. UEs 104, 106 transmit and receive discovery signals subject to a half-duplex constraint.

In some implementations of a Type 2 D2D discovery procedure, the eNB 102 will allocate resources for discovery signal transmission on a UE-specific basis. The eNB 102 may therefore assign a set of one or more D2D discovery resources to any particular UE 104. 106 in the cell 114. In accordance with current 3GPP standards, Type 2 discovery may be of either of two types: Type 2A, wherein the eNB 102 allocates resources to a UE 104, 106 for each specific transmission instance of discovery signals; or Type 2B, wherein the eNB 102 allocates resources semi-persistently for discovery signal transmission by a UE 104, 106.

Embodiments disclosed herein provide methods for allocating resources for the support of LIE Proximity Services (ProSe) D2D discovery. Some embodiments are described below with reference Type 1 and Type 2B discovery. However, it will be understood that embodiments can be extended to other discovery procedure types, including discovery procedure types that may be implemented in later versions and revisions to the 3GPP family of standards or other standards. Furthermore, while embodiments are described herein with reference to D2D discovery resource pools, in some implementations, and in some versions or amendments to standards of the 3GPP family of standards, D2D discovery resource pools may be referred to as D2D discovery zones.

In some available systems, a UE 104, 106 can participate in D2D discovery by selecting one D2D discovery resource, from a D2D discovery resource pool, on which to transmit a discovery signal. However, due to the half-duplex constraint, a UE 104, 106 that transmits discovery signals on a D2D resource would not be able to receive discovery signals transmitted on that same D2D resource. This may lead to an increased discovery latency depending on the number of UEs orthogonalized in the frequency dimension (i.e., by frequency-division multiplexing (FDM)). The latency can also depend on the periodicity of D2D discovery resource pools.

To address these and other concerns, embodiments extend available discovery procedures to allow multiple transmissions of discovery signals by a UE 104, 106 within each D2D discovery resource pool. By allowing these multiple transmissions, embodiments can help in achieving better discovery range because UEs receiving the discovery signals can combine multiple copies of the discovery signals that have been received on several resources of the D2D discovery resource pool. Multiple transmissions can also reduce latency because discovery signals would be transmitted more frequently in systems implemented in accordance with embodiments. Further, the UE-assistance mechanism for UE-specific resource allocation for Type 2 discovery, in accordance with some embodiments, can help achieve improved resource allocation that considers interference seen in the proximity of an announcing UE due to in-band emissions, for some loading conditions of Type 2 D2D discovery resource pools.

Figure 2:
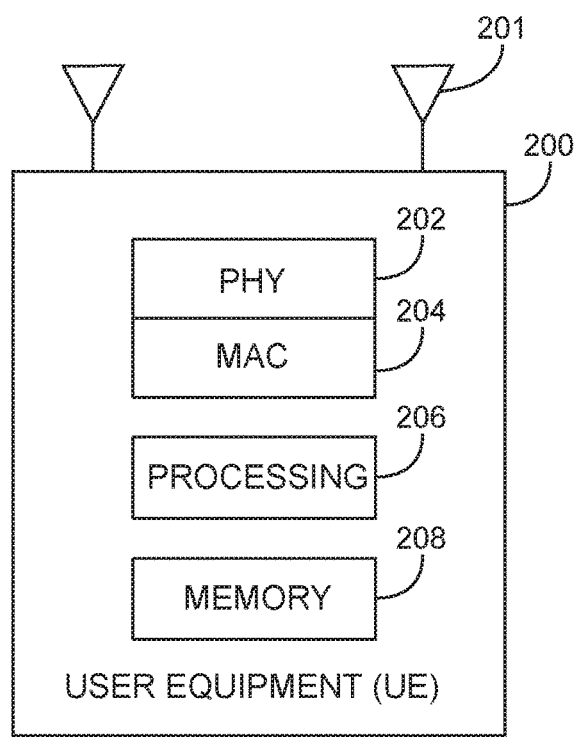
FIG. 2 is a functional diagram of a User Equipment (UE) in accordance with some embodiments.
Figure 3:
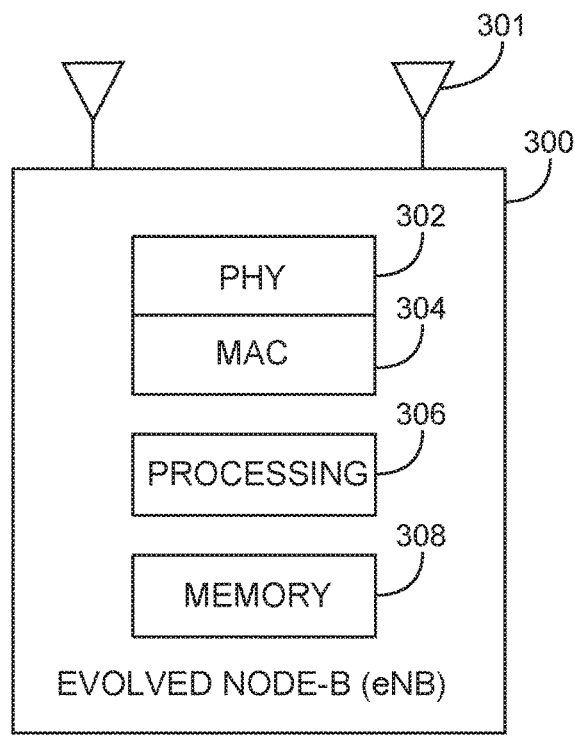
FIG. 3 is a functional diagram of an Evolved Node-B (eNB) in accordance with some embodiments.

FIG. 2 shows a block diagram of a UE 200, while FIG. 3 shows a block diagram of an eNB 300, for implementing methods to address at least concerns discussed above. It should be noted that in some embodiments, the eNB 300 may be a stationary non-mobile device. The UE 200 may be a UE 104, 106 as depicted in FIG. 1, while the eNB 300 may be an eNB 102 as depicted in FIG. 1.

The antennas 201, 301 may comprise one or more directional or omnidirectional antennas, including, for example, dipole antennas, monopole antennas, patch antennas, loop antennas, microstrip antennas, or other types of antennas suitable for transmission of RF signals. In some multiple-input multiple-output (MIMO) embodiments, the antennas 201, 301 may be effectively separated to take advantage of spatial diversity and the different channel characteristics that may result.

The UE 200 may include physical layer circuitry 202 for transmitting and receiving signals to and from the eNB 300, other eNBs, other UEs or other devices using one or more antennas 201. The eNB 300 may include physical layer circuitry 302 for transmitting and receiving signals to and from the UE 200, other eNBs, other UEs or other devices using one or more antennas 301. The UE 200 may also include medium access control layer (MAC) circuitry 204 for controlling access to the wireless medium, while the eNB 300 may also include medium access control layer (MAC) circuitry 304 for controlling access to the wireless medium.

The UE 200 may also include hardware processing circuitry 206 and memory 208 arranged to perform the operations described herein, and the eNB 300 may include hardware processing circuitry 306 and memory 308 arranged to perform the operations described herein.

Allocation of Sub-Discovery Resource Pools for Discovery Signal Transmission In one embodiment supporting resource allocation for D2D discovery, the eNB 300 logically divides the D2D discovery resource pool, for a cell 114 (FIG. 1) served by the eNB 102, into sub-discovery resource pools. These resources can be of equal size, although embodiments are not limited thereto. The eNB 102 can divide the D2D discovery resource pool based on time or based on frequency, for example. The eNB 300 will then generate configuration information for the D2D discovery resource pool, to include at least information concerning this sub-division. For example, the configuration information can include the number of sub-divisions, whether the sub-divisions are made based on time or frequency, etc. The eNB 300 will then transmit the configuration information to UEs in the cell 114.

UE 200 receives configuration information for the D2D discovery resource pool. The configuration information may be received from the eNB 300 although embodiments are not limited thereto and the configuration information can be received from neighboring cells, higher-layer network elements, etc. The configuration information will include an indication that the eNB 300 or other entity has logically divided the D2D discovery resource pool into two or more sub-discovery resource pools.

The UE 200 will perform an initial transmission of a discovery signal in a discovery period using a resource from a first sub-discovery resource pool of the two or more sub-discovery resource pools. The discovery signal can include a discovery media access control (MAC) protocol data unit (PDU) formatted in accordance with a standard of the 3GPP family of standards for LTE.

After this initial transmission, the UE 200 will perform a number of additional transmissions of the discovery signal. The UE 200 will make these additional transmissions within the same discovery period as the UE 200 made the initial transmission, and the UE 200 will use D2D discovery resources from additional sub-discovery resource pools, other than the first sub-discovery resource pool, of the two or more sub-discovery resource pools.

The UE 200 can determine the number of additional transmissions to perform based on a value provided by the eNB 300. The eNB 300 can provide this value in various ways. As an example, in some embodiments, the eNB 300 will provide an explicit field within the configuration information for the D2D discovery resource pool that indicates how often the UE 200 is to repeat the discovery signal within the discovery period. As a further example, the UE 200 may infer the number of additional transmissions to be made based on the logical subdivision of the D2D discovery resource pool. By way of illustration, if the configuration information for the D2D discovery resource pool indicates that the D2D discovery resource pool has been divided into ten sub-discovery resource pools, the UE 200 may infer that ten transmissions are to be made of the discovery signal. However, embodiments are not limited to any particular way of signaling this value for number of transmissions to the UE 200. Additionally, listening UEs can use this value to determine how many discovery signal transmissions should be expected to be transmitted by a transmitting UE. Further, listening UEs can combine this value with the hopping pattern, described in more detail later herein, to determine on which resource to expect the next transmission of the discovery signal by a transmitting UE.

In some embodiments, UE 200 will select at least the first D2D discovery resource from the first sub-discovery resource pool for the initial transmission of the discovery signal in accordance with a randomness algorithm, wherein the randomness algorithm operates such that the probability that any D2D discovery resource will be selected from the sub-discovery resource pool is equal to the probability that any other D2D discovery resource will be selected from the sub-discovery resource pool. However, the ideas disclosed in this invention can be applied to any other random resource selection algorithms. In at least these embodiments, the UE 200 will select the additional resources from the sub-discovery resource pools based on an intra-D2D discovery resource pool hopping pattern that maps resources of one sub-discovery resource pool to resources of other sub-discovery resource pools within the two or more of sub-discovery resource pools. For example, the hopping pattern may map resources of the sub-discovery resource pool on which the initial transmission is performed to other resources. In this way, a listening UE (not shown in FIG. 2) can use the hopping pattern, among other parameters, to know the location of resources on which to expect additional transmissions after the initial transmission of the discovery signal. The listening UE can then combine discovery packets to improve detection performance, especially for ULs that are signal-to-noise ratio (SNR)-limited.

The eNB 300 or other entity can define the hopping pattern to alleviate the half-duplex constraint. In some embodiments, at least when the eNB 300 logically subdivides the D2D discovery resource pool based on time, the UE 200 may perform the additional transmissions on D2D discovery resources from sub-discovery resource pools that are next available time resources, with respect to time, relative to the first sub-discovery resource pool. In at least these embodiments, the hopping pattern is limited to frequency hopping.

In some embodiments, the UE 200 can select a D2D discovery resource for each transmission of the discovery signal according to a randomness algorithm wherein the UE 200 selects one of the available D2D discovery resources from the D2D discovery resource pool (or a sub-discovery resource pool) with equal probability amongst the available resources in the D2D discovery resource pool. However, the ideas disclosed in this invention can be applied to any other randomness algorithms. In these embodiments, the UE 200 can select a first D2D discovery resource from the entire D2D discovery resource pool, or from a first sub-discovery resource pool, for the initial transmission. Subsequently, the UE 200 can independently select the second D2D discovery resource from a set that does not include the first D2D discovery resource or from a second sub-discovery pool. The UE 200 will then repeat this process from a set that includes neither the first nor the second sub-discovery resource pool, etc. In these embodiments, a listening UE may not be able to combine the multiple copies of the packets received within the discovery resource pool because the listening UE will be unable to predict the location of resources on which to expect each transmission of the discovery signal. However, these embodiments may exhibit less of an impact from the half-duplex constraint and thereby improve discovery latency performance.

UEs in accordance with some embodiments can control the interference by implementing distributed random silencing mechanisms. For example, in some embodiments, the UE 200 can decide whether to transmit discovery signals during a given discovery period. If the UE 200 decides to transmit during that discovery period, the UE 200 will transmit the discovery signal for the configured number of times within the D2D discovery resource pool. The UE 200 can implement this embodiment for cases in which pre-defined hopping patterns are used to select the D2D discovery resources from sub-discovery resource pools, although embodiments are not limited thereto. Listening UEs may therefore be able to combine discovery signal transmissions more efficiently because the listening UEs know to expect discovery signals on each sub-discovery resource pool.

In other embodiments, the UE 200 may decide, prior to each transmission of the discovery signal, for each sub-discovery resource pool whether to transmit the discovery signal on that sub-discovery resource [pp;. The UE 200 may implement this embodiment for cases in which the UE 200 does not use hopping patterns, in other words, in cases in which the UE 200 uses randomized selection algorithms described earlier herein to select each sub-discovery resource pool, although embodiments are not limited thereto.

The UE 200 may make the decision as to whether to transmit based on a transmission probability factor provided by the eNB 300 in accordance with a silencing/muting protocol. In one embodiment, the eNB 300 controls the effective arrival rate of the discovery packets, and thereby the interference level within the D2D discovery resource pools, by configuring a silencing/muting protocol. According to this silencing/muting protocol, each UE 200 that intends to transmit a discovery packet selects a resource from within the D2D discovery resource pool and then transmits the packet with a certain probability (1-p), with $0 \leq p \leq 1$, where p is the silencing factor. Upper network layers can configures p in a network-common manner or in a cell-specific manner. Some embodiments can include random silencing factors according to various algorithms or criteria, such as by providing a fixed silencing factor for all ProSe-enabled UEs. Additionally, UEs 200 can adapt the silencing factor in a distributed fashion depending on the history of transmissions of discovery packets in a prior D2D discovery resource pool.

UE Assistance Mechanism

Some embodiments provide a UE-assistance mechanism to enhance the UE-specific resource allocation by providing interference avoidance. As described earlier herein, with Type 2 discovery procedures, the eNB 300 assigns resources in a UE-specific manner. Although the eNB 300 can assign resources in a UE-specific manner such that multiple UEs do not transmit discovery signals on the same D2D discovery resources, the eNB 300 may not be aware of the interference conditions arising from in-band emissions on different physical resource block (PRB)-pairs for different UEs. Embodiments, therefore, provide mechanisms to take advantage of UE 200 knowledge of interference conditions.

A UE 200 can transmit a resource request to an eNB 300 for UE-specific allocation of D2D discovery resources for transmission of discovery signals, wherein the resource request includes power measurement reports for the D2D discovery resources. The request can include the indices M discovery resources with lowest received power within the Type 2 D2D discovery resource pool, where M is an integer greater than or equal to 1. In other embodiments, the request can include the indices of M D2D discovery resources within a particular sub-discovery resource pool with lowest received power relative to other D2D discovery resources of any particular sub-discovery resource pool. While power measurements have been described herein, the UE 200 can also submit any other measurements for determining interference conditions.

The UE 200 can use configuration information for the D2D discovery resource pool that was previously provided by the eNB 300 for help in providing power measurement reports. This configuration information can include an indication as to whether the D2D discovery resource pool is a Type 1 or Type 2 discovery resource pool. If the D2D discovery resource pool is a Type 2 discovery resource pool, the UE 200, when in RRC_IDLE, will monitor the D2D discovery resource pool by listening on all resources and measuring received power on these resources. Based on these measurements, the UE 200 can send the resource request along with indices of M discovery resources on which the UE 200 measures lowest received power. Again, while power measurements have been described herein, the UE 200 can also submit any other measurements for determining interference conditions.

The eNB 300 can use the measurement information from all UEs requesting resources for Type 2 discovery within the Type 2 D2D discovery resource pool to assign resources to UEs to reduce or eliminate interference. In order to limit signaling overhead, the number of resources with lowest received power may be limited to a small number (e.g., M=3 or 5).

By providing centralized processing of UE measurements at the eNB 300, embodiments can provide higher discovery probability for UEs transmitting discovery signals in accordance with Type 2 discovery procedures. In various embodiments, the eNB 300 can analyze the reports from requesting UEs and allocate resources according to, among other criteria, the geographical relationship between UEs in the cell. For example, the eNB 300 may allocate resources such that UEs within a threshold distance of each other transmit discovery signals simultaneously to minimize in-band emission impact and synchronization issues. Furthermore, closely located UEs can successfully decode discovery signals from each other based on fewer transmissions of the discovery signal, due to relatively good propagation conditions. Therefore the half-duplex problem between these UEs can be resolved by allowing transmission in different time-resources using only a few (on the order of one or two) transmission opportunities. Further, the eNB 300 can use the path gain to the eNB 300 from different UEs to determine how to allocate resources for discovery signal transmission.

In one embodiment, the eNB 300 may analyze UE 200 reports and assign resources orthogonalized by time-division multiplexing (TDM) to UEs that can be grouped according to geographical closeness for D2D discovery resource pools according to Type 2A discovery procedures. In at least these embodiments, the eNB 300 can subsequently assign resources according to Type 2B resource allocation such that UEs belonging to each group are orthogonalized by FDM even with resource hopping across multiple D2D discovery resource pools.

In some embodiments, the eNB 300 can allocate resources based on priority levels of the UEs within the cell served by the eNB 300. The eNB 300 can configure a first D2D discovery resource pool with a first size at a first time instant, and a second D2D discovery resource pool with a second size at a second time instant, wherein the size of the respective resource pools and the number of individual D2D discovery resources allocated for a plurality of transmissions of discovery signals within each discovery period by each UE are based on criteria such as, for example, the number and priority levels of UEs within the cell.

The eNB 300 may determine whether to perform UE assistance mechanisms based on cell loading. For example, if cell loading falls below a threshold, sufficient resources should be available to orthogonalize the transmissions from the UEs effectively. Accordingly, the eNB 300 may enable or disable UE 200 power measurement reporting based on load conditions. By extension, if such power measurement reporting is disabled, discovery latency may be reduced or eliminated because the UE 200 can transmit resource requests without taking time to perform power measurements.

For network-common configuration of D2D discovery resource pools, coordination may be provided between the neighboring cells to realize the benefits of UE-specific D2D discovery resource allocation. Such coordination can be realized even with non-ideal backhaul connections between eNBs, because of the long periodicity of D2D discovery resource pools.

Although the UE 200 and eNB 300 are each illustrated herein as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware, and software. Embodiments may also be implemented as instructions stored on a computer-readable storage device, which may be read and executed by at least one processor to perform the operations described herein. A computer-readable storage device may include any non-transitory mechanism that stores information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors that can be configured with instructions stored on a computer-readable storage device.

These instructions can, for example, configure a communication device such as the UE 200 to receive configuration information for a D2D discovery resource pool of a cell. The configuration information can include an indication that the D2D discovery resource has been logically divided into a plurality of sub-discovery resource pools. The instructions can configure the UE 200 to perform an initial transmission of a discovery signal in a discovery period using a single D2D discovery resource from a first sub-discovery resource pool of the plurality of sub-discovery resource pools. The discovery signal can include a MAC PDU formatted in accordance with a standard of the 3GPP family of standards for LTE. The instructions can configure the UE 200 to perform a number of additional transmissions of the discovery signal in the discovery period using additional D2D discovery resources from sub-discovery resource pools of the plurality of sub-discovery resource pools other than the first sub-discovery resource pool.

Figure 4:
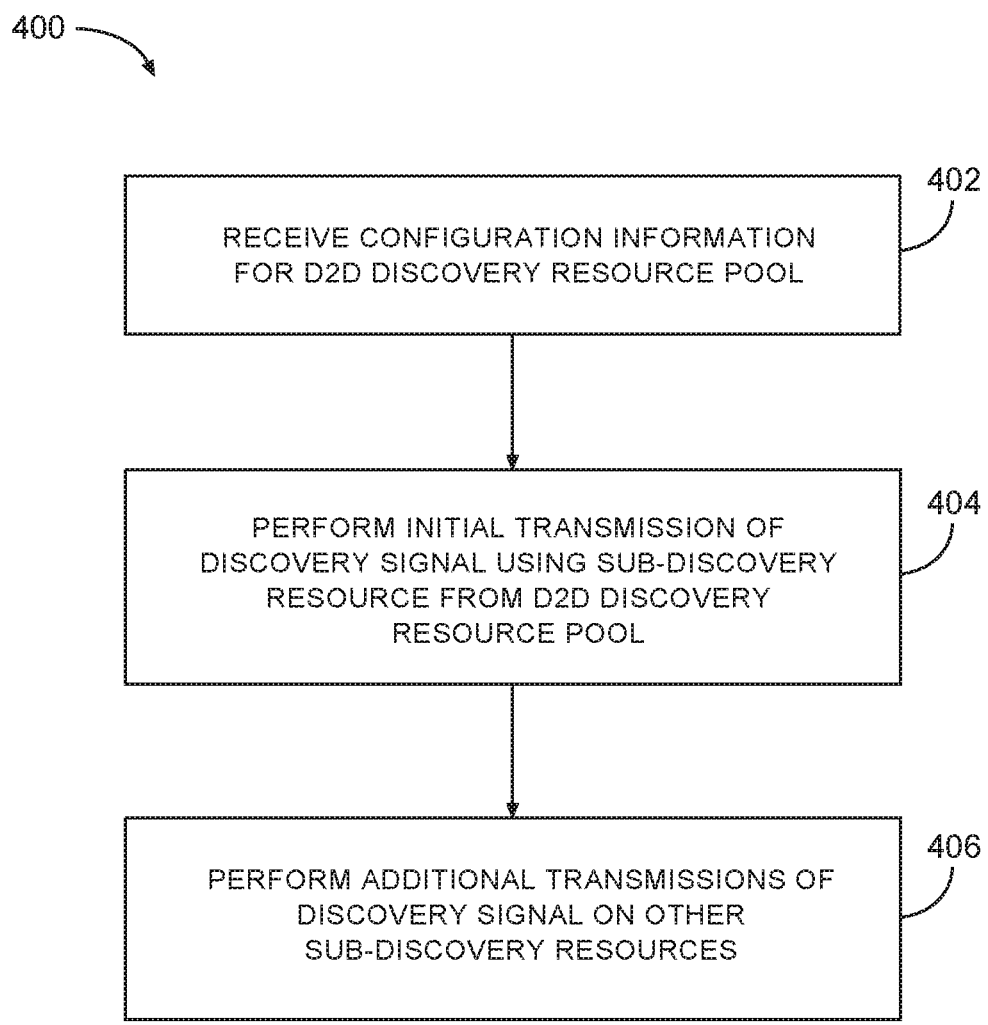
FIG. 4 illustrates the operation of a method of device-to-device (D2D) communication at a UE in accordance with some embodiments.

FIG. 4 is a flow chart of a method 400 for D2D discovery in accordance with some embodiments. The example method 400 is described with respect to elements of FIG. 1-3. UEs 104, 106 (FIG. 1) or (FIG. 2) can perform at least some operations of the method 400.

In operation 402, the UE 200 receives, from an eNB 300, configuration information for a D2D discovery resource pool of a cell served by the eNB 300. The configuration information includes an indication that the D2D discovery resource has been logically divided into a plurality of sub-discovery resource pools.

In operation 404, the UE 200 performs an initial transmission of a discovery signal in a discovery period using a D2D discovery resource from a first sub-discovery resource pool of the plurality of sub-discovery resource pools. The discovery signal includes a MAC PDU formatted in accordance with a standard of the 3GPP family of standards for LTE.

In operation 406, the UE 200 performs a number of additional transmissions of the discovery signal in the discovery period using D2D discovery resources from one or more of the sub-discovery resource pools other than the first sub-discovery resource pool. As described earlier herein, the number of additional transmissions to be performed will be based on a value, implicitly or explicitly provided by the eNB 300.

The UE 200 can perform other operations as part of example method 400 to support D2D discovery. For example, the UE 200 may select from the sub-discovery resource pools available for additional transmissions based on a hopping pattern that maps resources of the first sub-discovery resource pool to resources of other sub-discovery resource pools. The LIE 200 can also receive discovery signals to discover other UEs for D2D communication as described earlier herein, based on the hopping pattern or on any other parameters.

Figure 5:
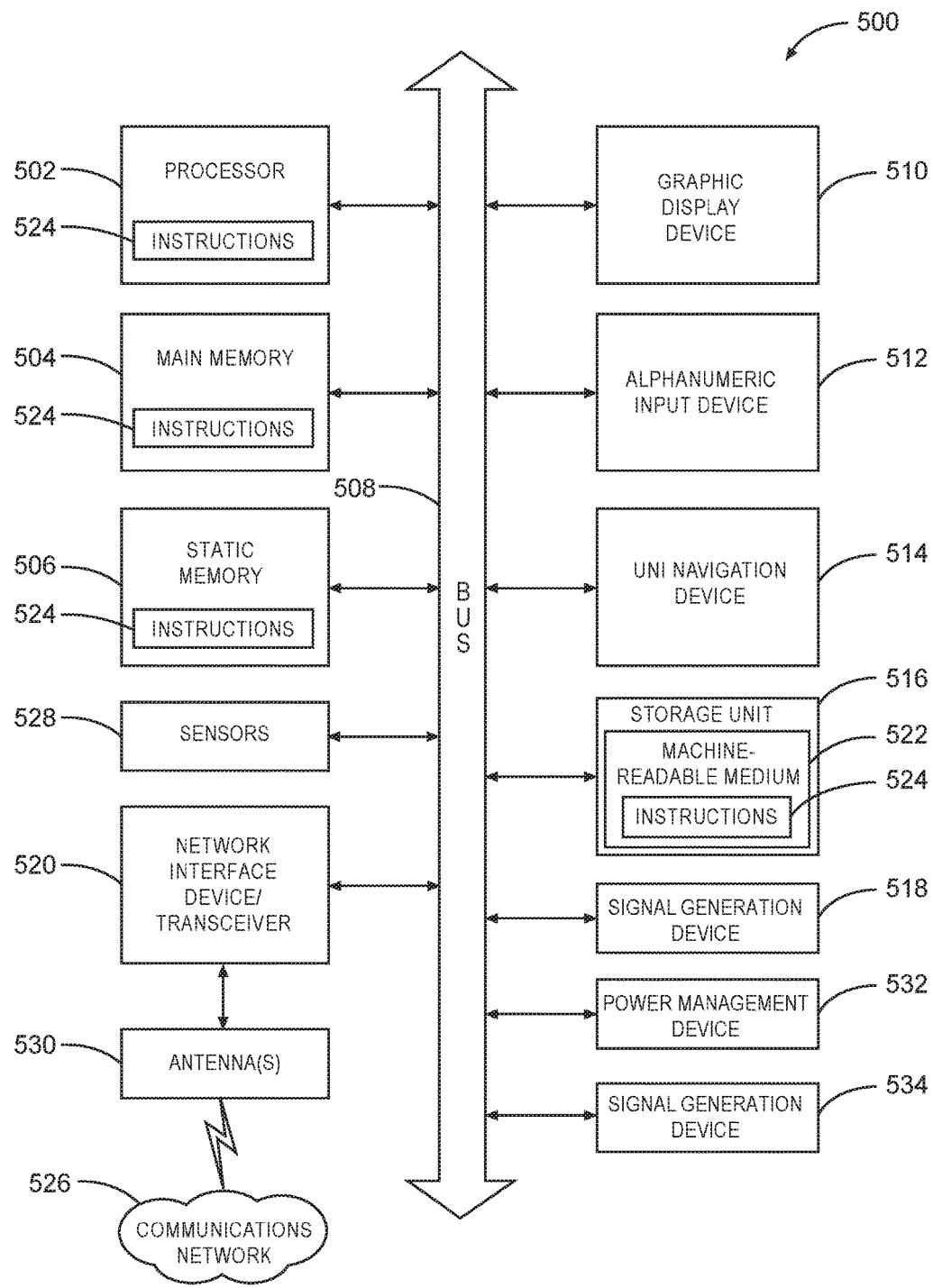
FIG. 5 is a block diagram of a machine for executing some embodiments.

FIG. 5 is a block diagram of a machine 500 for executing various embodiments. In alternative embodiments, the machine 500 may operate as a standalone device or may be connected (e.g., networked) to other machines.

The machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a power management device 532, a graphics display device 510, an alphanumeric input device 512 (e.g., a keyboard), and a user interface (UI) navigation device 514 (e.g., a mouse). In an example, the graphics display device 510, alphanumeric input device 512 and UI navigation device 514 may be a touch screen display. The machine 500 may additionally include a storage device 516 (i.e., drive unit), a signal generation device 518 (e.g., a speaker), a network interface device/transceiver 520 coupled to antenna(s) 530, and one or more sensors 528, such as a global positioning system (GPS) sensor, compass, accelerometer, or other sensor. The machine 500 may include an output controller 534, such as a serial (e.g., universal serial bus (USB), parallel, or other wired or wireless (e.g., infrared (IR), near field communication (NFC), etc.) connection to communicate with or control one or more peripheral devices (e.g., a printer, card reader, etc.).

The storage device 516 may include a machine-readable medium 522 on which is stored one or more sets of data structures or instructions 524 (e.g., software) embodying or utilized by any one or more of the techniques or functions described herein. The instructions 524 may also reside, completely or at least partially, within the main memory 504, within the static memory 506, or within the hardware processor 502 during execution thereof by the machine 500. In an example, one or any combination of the hardware processor 502, the main memory 504, the static memory 506, or the storage device 516 may constitute machine-readable media.

While the machine-readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions 524 for execution by the machine 500 and that cause the machine 500 to perform any one or more of the techniques of the present disclosure, or that is capable of storing, encoding or carrying data structures used by or associated with instructions 524. Non-limiting machine-readable medium examples may include solid-state memories, and optical and magnetic media. In an example, a massed machine-readable medium comprises a machine readable medium with a plurality of particles having resting mass.

Specific examples of massed machine-readable media may include: non-volatile memory, such as semiconductor memory devices (e.g., Electrically Programmable Read-Only Memory (EPROM), or Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device/transceiver 520 utilizing any one of a number of transfer protocols (e.g., frame relay, internet protocol (IP), transmission control protocol (TCP), user datagram protocol (UDP), hypertext transfer protocol (HTTP), etc.).

Although the present inventive subject matter has been described in connection with some embodiments, it is not intended to be limited to the specific form set forth herein. One of ordinary skill in the art would recognize that various features of the described embodiments may be combined in accordance with the disclosure. Moreover, it will be appreciated that various modifications and alterations may be made by those of ordinary skill in the art without departing from the scope of the disclosure.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a user equipment (UE), comprising:
processing circuitry, the processing circuitry configured to:
decode signaling with device-to-device (D2D) discovery configuration information, the discovery configuration information including a discovery resource pool with a set of subframes;
encode a D2D discovery signal for an initial transmission during a discovery period and using a subframe from the set of subframes in the discovery resource pool, wherein a probability that the UE is configured to transmit the discovery signal is based on a transmission probability factor from an evolved Node-B (eNB) serving a cell associated with the UE; and
cause additional transmissions of the discovery signal using at least another subframe of the set of subframes in the discovery resource pool, wherein each transmission of the additional transmissions is performed using at least two physical resource blocks per slot associated with the at least another subframe; and memory, the memory coupled to the processing circuitry and configured to store the transmission probability factor.

2. The apparatus of claim 1, wherein the processing circuitry is configured to:
decode the transmission probability factor from the eNB, the transmission probability factor indicating a probability of transmission during the discovery period.

3. The apparatus of claim 1, wherein the signaling includes higher-layer signaling.

4. The apparatus of claim 3, wherein the higher-layer signaling includes radio resource control (RRC) signaling.

5. The apparatus of claim 1, wherein a number of the additional transmissions is based on a value provided by an evolved Node-B (eNB) serving a cell associated with the UE.

6. The apparatus of claim 1, wherein the discovery period is a Type 1 D2D discovery period for non-UE specific transmissions or a Type 2 D2D discovery period for UE-specific transmissions, and the initial transmission takes place during contiguous resource blocks of the subframe.

7. The apparatus of claim 1, wherein the processing circuitry is configured to:
encode a resource request for Type 2 UE-specific D2D discovery resources within the D2D discovery pool.

8. The apparatus of claim 7, wherein the resource request includes a power measurement report for the D2D discovery resources.

9. The apparatus of claim 7, wherein the request includes indices of M discovery resources with a lowest received power within the D2D discovery pool, M being an integer greater than or equal to 1.

10. The apparatus of claim 1, wherein the discovery configuration information includes an indication that the discovery resource pool is logically subdivided into a plurality of sub-discovery resource pools.

11. The apparatus of claim 10, wherein the processing circuitry is configured to:
encode the discovery signal for the initial transmission during the discovery period using resources from a first sub-discovery resource pool of the plurality of sub-discovery resource pools.

12. The apparatus of claim 11, wherein the processing circuitry is configured to:
encode the discovery signal for the additional transmissions using additional D2D discovery resources from at least a second sub-discovery resource pool of the plurality of sub-discovery resource pools.

13. The apparatus of claim 12, wherein the processing circuitry is configured to:
select the additional D2D discovery resources from the plurality of sub-discovery resource pools based on a hopping pattern that maps resources of the first sub-discovery resource pool to resources of other sub-discovery resource pools of the plurality of sub-discovery resource pools.

14. The apparatus of claim 1, wherein the processing circuitry is configured to:
select the subframe for the initial transmission of the discovery signal from the discovery resource pool according to a randomness algorithm such that a probability of a first D2D discovery resource will be selected from the discovery resource pool is equal to a probability that any other D2D discovery resource will be selected from the discovery resource pool.

15. The apparatus of claim 1, wherein the D2D discovery signal includes a discovery media access control (MAC) protocol data unit (PDU) formatted in accordance with a standard of the 3rd Generation Partnership Project (3GPP) family of standards for Long Term Evolution (LTE).

16. The apparatus of claim 1, further comprising:
one or more antennas; and
transceiver circuitry coupled to the processing circuitry and the one or more antennas, and configured to transmit the D2D discovery signal.

17. A non-transitory computer readable storage device including instructions stored thereon, which when executed by one or more processors of a User Equipment (UE), cause the UE to perform operations to:
decode signaling with device-to-device (D2D) discovery configuration information, the discovery configuration information including a discovery resource pool with a set of subframes;
encode a D2D discovery signal for an initial transmission during a discovery period and using a subframe from the set of subframes in the discovery resource pool, wherein a probability that the UE is configured to transmit the discovery signal is based on a transmission probability factor from an evolved Node-B (eNB) serving a cell associated with the UE; and
cause additional transmissions of the discovery signal using at least another subframe of the set of subframes in the discovery resource pool, wherein each transmission of the additional transmissions is performed using at least two physical resource blocks per slot associated with the at least another subframe.

18. The non-transitory computer readable storage device of claim 17, wherein the instructions further cause the UE to perform operations to:
decode the transmission probability factor from the eNB, the transmission probability factor indicating a probability of transmission during the discovery period.

19. The non-transitory computer readable storage device of claim 17, wherein a number of the additional transmissions is based on a value provided by an evolved Node-B (eNB) serving a cell associated with the UE.

20. The non-transitory computer readable storage device of claim 17, wherein the discovery period is a Type 1 D2D discovery period for non-UE specific transmissions or a Type 2 D2D discovery period for UE-specific transmissions, and the initial transmission takes place during contiguous resource blocks of the subframe.

21. The non-transitory computer readable storage device of claim 17, wherein the instructions further cause the UE to perform operations to:
encode a resource request for Type 2 UE-specific D2D discovery resources within the D2D discovery pool.

22. The non-transitory computer readable storage device of claim 21, wherein the resource request includes a power measurement report for the D2D discovery resources.

23. The non-transitory computer readable storage device of claim 21, wherein the request includes indices of M discovery resources with a lowest received power within the D2D discovery pool, M being an integer greater than or equal to 1.

24. The non-transitory computer readable storage device of claim 17, wherein the discovery configuration information includes an indication that the discovery resource pool is logically subdivided into a plurality of sub-discovery resource pools.

25. The non-transitory computer readable storage device of claim 24, wherein the instructions further cause the UE to perform operations to:
    encode the discovery signal for the initial transmission during the discovery period using resources from a first sub-discovery resource pool of the plurality of sub-discovery resource pools.

26. The non-transitory computer readable storage device of claim 25, wherein the instructions further cause the UE to perform operations to:
    encode the discovery signal for the additional transmissions using additional D2D discovery resources from at least a second sub-discovery resource pool of the plurality of sub-discovery resource pools.

27. The non-transitory computer readable storage device of claim 26, wherein the instructions further cause the UE to perform operations to:
    select the additional D2D discovery resources from the plurality of sub-discovery resource pools based on a hopping pattern that maps resources of the first sub-discovery resource pool to resources of other sub-discovery resource pools of the plurality of sub-discovery resource pools.

28. An apparatus of a user equipment (UE), comprising processing circuitry and transceiver circuitry, the processing circuitry configured to:

decode signaling with device-to-device (D2D) discovery configuration information, the discovery configuration information identifying a discovery resource pool with a set of subframes;

encode a D2D discovery signal for an initial transmission during a discovery period and using a subframe from the set of subframes in the discovery resource pool, wherein a probability that the UE is configured to transmit the discovery signal is based on a transmission probability factor from an evolved Node-B (eNB) serving a cell associated with the UE; and cause additional transmissions of the discovery signal using at least another subframe of the set of subframes in the discovery resource pool, wherein a number of the additional transmissions is based on a value provided by the eNB.

* * * * *

UNITED STATES PATENT AND TRADEMARK OFFICE
CERTIFICATE OF CORRECTION

PATENT NO. : 9,999,063 B2  
APPLICATION NO. : 15/730287  
DATED : June 12, 2018  
INVENTOR(S) : Chatterjee et al.

Page 1 of 1

It is certified that error appears in the above-identified patent and that said Letters Patent is hereby corrected as shown below:

On the Title Page

Item (*), in "Notice", in Column 1, Line 3, delete "days. days." and insert --days.-- therefor On page 4, in Column 1, item (56), under "Other Publications", Line 13, delete "Rau" and insert --RAU-- therefor On page 5, in Column 1, item (56), under "Other Publications", Line 60, delete "MFB"," and insert --MFBI",-- therefor Signed and Sealed this  
Twenty-eighth Day of May, 2019

Andrei Iancu  
*Director of the United States Patent and Trademark Office*